United States Patent [19]
McMath

[11] 3,734,115
[45] May 22, 1973

[54] SPRING BIASED SAFETY VALVE

[75] Inventor: Jack A. McMath, Fort Thomas, Ky.

[73] Assignee: Dover Corporation, New York, N.Y.

[22] Filed: Apr. 26, 1971

[21] Appl. No.: 137,171

[52] U.S. Cl. .....................137/73, 137/75, 137/517, 137/539
[51] Int. Cl......F16k 15/04, F16k 17/30, F16k 17/38
[58] Field of Search ..........................137/75–77, 137/457, 449, 460, 517, 519.5,

[56] References Cited

UNITED STATES PATENTS

| 701,754 | 6/1902 | Moran | 137/517 X |
| 1,243,998 | 10/1917 | Smyly | 137/75 |
| 2,030,019 | 2/1936 | Bard | 137/77 |
| 2,707,965 | 5/1955 | Allen | 137/75 |
| 3,421,547 | 1/1969 | Aslan | 137/539 |

FOREIGN PATENTS OR APPLICATIONS 536,051  5/1941  Great Britain..........................137/75

*Primary Examiner*—Martin P. Schwadron
*Assistant Examiner*—Richard Gerard
*Attorney*—Kinney & Schenk

[57] ABSTRACT

A biased safety valve for preventing the flow of materials therethrough in the presence of predetermined conditions is disclosed. Resilient means urges an outlet closure member upstream away from the outlet. When the predetermined conditions have been met, the closure member overcomes the resistance of the resilient means and is seated against the outlet to prevent further flow therethrough.

9 Claims, 10 Drawing Figures

PATENTED MAY 22 1973 3,734,115

INVENTOR.
JACK A. McMATH

BY
Kinney & Schenk
ATTORNEYS

SPRING BIASED SAFETY VALVE

BACKGROUND OF THE INVENTION

This invention relates to valves and more particularly to a safety valve in which the valve closure member is resiliently biased upstream of the outlet in the absence of predetermined conditions.

There are many instances where it is desirable to prevent the flow of a fluid, such as paint, into an area under certain operating conditions. This is particularly true in fields of automation where no operator is present. One example of this is in the assembly line painting of automobiles. A hose may rupture causing paint to spew therefrom. In the absence of an operator at that point, large excesses of paint will be lost. Another danger is that of fire. Should a fire occur, it is necessary that the paint be prevented from flowing into the area. It is very desirable to have a safety valve which would be responsive to either of the aforementioned conditions. Thus, when either condition would arise, the valve must provide a positive sealing action to prevent the flow of any further material through the valve.

Accordingly, it is an object of this invention to provide a safety valve responsive to a differential in pressure between the inlet and outlet.

A further object of this invention is to provide a safety valve which is responsive to elevations in temperature. Yet another object of this invention is to provide a safety valve which is responsive to both a differential in pressure and an elevation in temperature.

A still further object of this invention is to provide a safety valve having an outlet closure member resiliently biased upstream of the outlet in the operable condition.

SUMMARY OF THE INVENTION

This invention provides an improved safety valve for preventing the flow of material therethrough in the presence of predetermined conditions. The predetermined conditions are a differential in pressure between the inlet and outlet or a predetermined rise in external temperature. The safety valve is of simple and economical construction, is responsive to fluid pressure and has a positive seating action. The safety valve comprises a spring-biased closure member which is biased upstream away from the outlet in the absence of the predetermined conditions.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which.

DESCRIPTION OF ILLUSTRATED EMBODIMENTS

Figure 1:
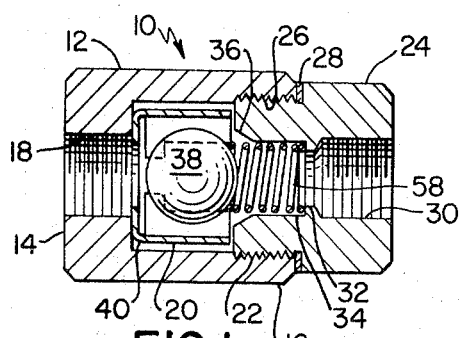
FIG. 1 is a sectional view illustrating one exemplary embodiment of this invention.
Figure 2:
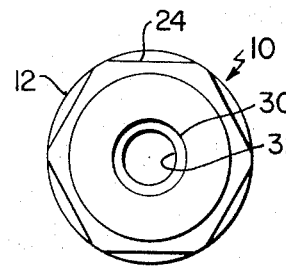
FIG. 2 is an end view of the valve of FIG. 1 as viewed from the outlet end.

Reference is now made to FIGS. 1 and 2 of the drawing which illustrates one exemplary embodiment of the safety valve of this invention, which is designated generally by the reference numeral 10. The safety valve 10 is comprised of a housing 12 having an inlet end 14 and an outlet end 16.

The inlet end 14 is formed with an aperture 18 having suitable means, such as threads, to cooperatively receive a supply line. The aperture 18 is in communication with a large bore 20 which terminates at the outlet end with suitable connecting means such as threads 22. An end cap 24 having complementary threads 26 is threadably secured to the housing 12 to provide the valve outlet. A suitable gasket 28 is inserted between housing 12 and end cap 24.

The end cap 24 is formed with an outlet aperture 30 having suitable means such as threads to cooperatively engage a workpiece or further extension of the supply line. The aperture 30 terminates with a shoulder 32 which also forms the end wall of a bore 34. The other end of bore 34 is formed to provide a valve seat surface 36 to receive a closure member or ball 38 in seating engagement to prevent flow of material through the valve in a manner to be described herebelow.

Figure 3:
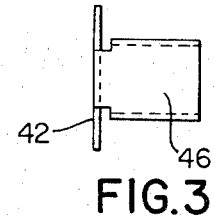
FIG. 3 is a top view of the guide element.
Figure 4:
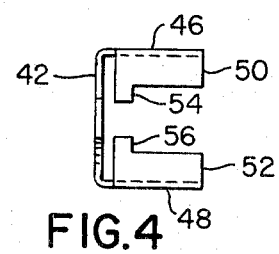
FIG. 4 is a side view of the guide element.
Figure 5:
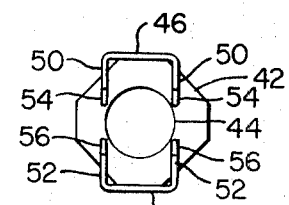
FIG. 5 is an end view of the guide element.

A guide member 40 is mounted in the bore 20 of housing 12 and serves to provide a raceway for the ball 38. As best seen in FIGS. 3-5, the guide member 40 is preferably formed from a single piece of material and is of a substantially U-shape. The end plate 42 is formed with an aperture 44 therethrough. Thus, when the guide 40 is mounted as in FIG. 1, fluid may pass from the aperture 18 through the aperture 44 and into the bore 20. Parallel arms 46 and 48 extend outward from the end plate 42. The edges 50 and 52 of the arms 46 and 48, respectively, are bent perpendicular to the respective arms so as to form opposing U-shaped raceways along which the ball 38 is movable. The edges 50 and 52 terminate in protruding shoulders 54 and 56 which serve as an abutment to engage the ball 38 and prevent its further movement towards the aperture 44. In this manner, the ball 38 cannot be urged into contact with the aperture 44 so as to close the aperture.

Referring again to FIG. 1, a resilient means, such as a spring 58, is placed in bore 34. The spring 58 abuts at one end against shoulder 32 and at the other end against the ball 38. The spring 58 acts against the ball 38 to bias the ball 38 upstream and away from the valve seat surface 36. In this position, the valve is open and fluid may flow therethrough. However, should there be a sudden surge of fluid pressure at the inlet end or a drop in the outlet pressure, the force of the fluid acting on the ball 38 will overcome the resistance of spring 58. The ball 38 will thus be urged downstream into sealing engagement with the valve seat surface 36 to close the valve and prevent flow of any further material therethrough. The force of the fluid or material from the upstream side will keep the ball 38 in engagement with the valve seat surface 36 and will keep the valve in a closed position until such time as the problem causing the differential in pressure has been corrected. It is seen that the normally biased open valve will be closed in the presence of a differential in pressure between the inlet and the outlet of the valve 10.

Figure 6:
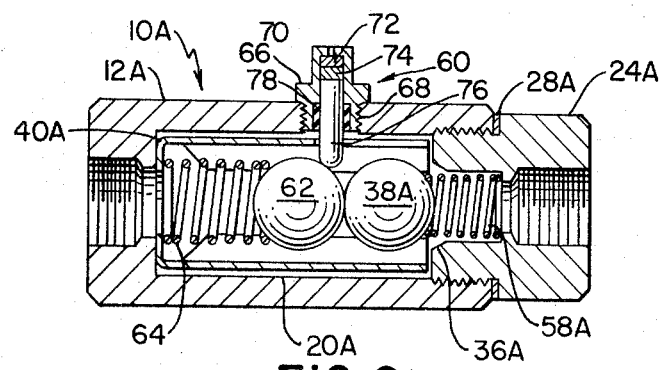
FIG. 6 is a sectional view illustrating another exemplary embodiment of this invention and particularly illustrating the invention of FIG. 1 in combination with a temperature responsive device.
Figure 7:
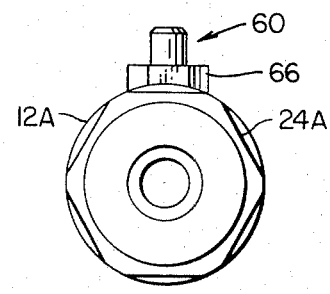
FIG. 7 is an end view of the valve of FIG. 6 as viewed from the outlet end.
Figure 8:
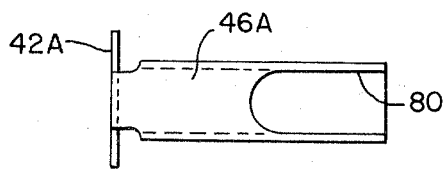
FIG. 8 is a top view of the guide used in the embodiment of FIG. 6.
Figure 10:
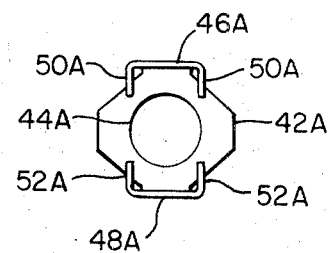
FIG. 10 is an end view of the guide of FIGS. 8 and 9.
Figure 9:
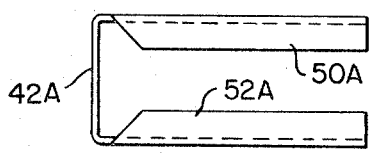
FIG. 9 is a side view of the guide used in the embodiment of FIG. 6.

Another exemplary embodiment of this invention is illustrated in FIGS. 6 and 7 of the drawings. The safety valve illustrated in FIGS. 6 and 7 is very similar to the safety valve 10; therefore, such safety valve will be designated generally by the reference numeral 10A and parts of the safety valve 10A which are very similar to corresponding parts of the safety valve 10 will be designated by the same reference numeral as safety valve 10, also followed by the letter designation A and not described again. The main difference between the safety valve 10A and the safety valve 10 is that a further safety feature has been incorporated in the valve 10A.

The additional safety feature is a fusible plug assembly, shown generally as 60, cooperatively acting with a ball 62 biased downstream by suitable means such as a spring 64.

The plug assembly 60 comprises a nut 66 which is suitably secured in the housing 12A by any means such as cooperating threads 68. The nut 66 is formed with a bore 70 extending therethrough. Fusible plugs 72 and 74 are inserted in the bore 70 and are urged into contact with the end of the bore by a plunger or fuse pin 76 which is slidable within the bore 70. The pin 76 has a rounded end which protrudes outward beyond the end of the nut 66. A suitable seal, such as a Teflon ring 78, is mounted in the end of the nut 66 and prevents any fluid from entering the bore 70 and solidifying therein so as to prevent movement of the pin 76. The pin 76 extends into the bore 20A and protrudes through slot 80 in the upper arm 46A of the guide 40A. In this manner, the pin 76 engages the ball 62 and prevents its movement downstream.

The edges 50A and 52A of arms 46A and 48A form the raceways upon which balls 62 and 38A are movable.

In the presence of an excessive temperature, the fusible plugs 72 and 74 will melt. Suitable apertures may be formed in the end of the nut 66 so that the fusible plugs may be in direct communication with the external environment. As the fusible plugs 72 and 74 are melted, the compressed spring 64 as well as the fluid pressure of the material passing through the valve 10A, act on the ball 62 and urge the ball in the downstream direction urging ball 38A against spring 58A. It should be noted that the spring 64 has a greater strength than that of spring 58A. The pin 76 will ride up the rounded edge of the ball 62 until such time as the pin 76 clears the extreme outer dimension of the ball 62. At this point, there is no further restraining force acting on the ball 62 and the action of the spring 64 and fluid pressure forces the ball 38A into sealing engagement with the valve seat surface 36A to close the safety valve 10A and prevent further flow therethrough.

The safety valve 10A of FIG. 6 is thus responsive to dual conditions, i.e., either a differential in pressure between the inlet and outlet or an excessive temperature. Hence, if either condition exists, the safety valve will close due to the ball 38A being forced into seating engagement with the valve seat 36A.

The fusible plugs 72 and 74 may be chosen from any suitable material according to the temperature at which the valve is desired to be closed. In addition, the sensitivity of the valve can be varied by using springs having different strengths. It can be seen that the safety valves of this invention are of simple and economical construction, are responsive to predetermined conditions and have a positive seating action after such predetermined conditions have been reached. Accordingly, it can be seen that the objects of this invention hereinbefore set forth have been accomplished.

While present exemplary embodiments of this invention have been illustrated and described, it will be recognized that this invention will be otherwise variously embodied and practiced by those skilled in the art.

What is claimed is:

1. A normally open flow safety valve having a closed flow position in the presence of one of two predetermined conditions, said valve comprising a housing having an inlet and an outlet and a bore connecting the inlet and outlet for fluid flow therethrough, an outlet closure member mounted in said bore upstream of the outlet, resilient means normally urging said closure member upstream away from the outlet to an open flow position, said closure member being movable from the first normally open flow position to a second closed flow position in response to a fluid pressure differential condition between the inlet and outlet sufficient to urge said closure member downstream against said resilient means, downstream urging means mounted in said bore upstream of said closure member and coacting therewith to urge said closure member downstream to the closed flow position, temperature responsive means mounted in said housing and projecting radially inwardly into said bore to engage said urging means to prevent downstream movement thereof, said temperature responsive means being movable radially outwardly by said urging means in the presence of a predetermined temperature wherein said urging means urges said closure member downstream against said resilient means to the closed flow position.

2. A safety valve as set forth in claim 1 in which said closure member is a ball and said resilient means is a spring and further comprising a guide mounted in said bore, said guide forming a raceway for movement of said ball therealong.

3. The valve as set forth in claim 2 in which said downstream urging means is a second ball mounted in said raceway upstream from said first ball, a second spring biasing said second ball downstream into engagement with said first ball, said second spring having a greater strength than the spring acting on said first ball, said temperature responsive means engaging said second ball wherein said second ball is released for movement downstream to urge said first ball into sealing engagement with said outlet in response to said predetermined temperature.

4. A valve as set forth in claim 3 in which said temperature responsive means comprises a nut threadably secured in said housing, said nut being formed with a bore from one end to adjacent the other end, fusible plugs mounted in said nut bore at said other end, a pin slidably mounted in said nut bore and engaging said fusible plugs at one end, the other end of said pin engaging said second ball to restrict the downstream movement of said second ball, said plugs being meltable at said predetermined temperature wherein said pin is urged radially outwardly along said nut bore by the force of said second spring acting on said second ball wherein said second ball can be urged downstream when said pin has moved radially outwardly along said nut bore a sufficient distance.

5. A safety valve operational in response to one of two predetermined conditions comprising a housing having an inlet, a bore in communication with the inlet, a guide mounted in said bore, said guide having parallel arms extending along said bore, said arms having upturned edges to form a raceway along said bore, a ball mounted for movement along said raceway, an end cap having a bore therethrough, means mounting said end cap to said housing to form the valve outlet, said end cap being formed with a valve seat surface at the inward edge thereof and terminating in said end cap bore, resilient means mounted in said end cap bore engaging said ball and urging said ball upstream along said raceway away from said valve seat surface wherein said valve is in the open condition for flow and whereby said ball is urged downstream to overcome the resistance of said resilient means in response to a predetermined pressure differential condition between the inlet and outlet sufficient to urge said ball downstream against said resilient means, downstream urging means mounted in said guide upstream of said first ball to urge said ball downstream into seating engagement with said valve seat surface, and temperature responsive means mounted in said housing and projecting radially inwardly to engage said urging means to prevent downstream movement thereof, said temperature responsive means being movable radially outwardly by said urging means in the presence of a predetermined temperature wherein said urging means urges said ball into engagement with said valve seat surface in response to said predetermined external temperature.

6. A valve as set forth in claim 5 further comprising abutment means formed in the end cap bore between said valve seat surface and outlet end and against which said resilient means acts.

7. A valve as set forth in claim 5 in which said urging means comprises a second ball mounted in said raceway upstream of said first ball and a spring mounted upstream of said second ball and urging said second ball downstream with a force greater than that of said resilient means.

8. A valve as set forth in claim 7 in which said temperature responsive means comprises a nut threadably secured in said housing, said nut having a bore from one end to adjacent the other end, a fusible plug mounted in said nut bore at said other end, an elongated pin extending inwardly from said nut bore and into restraining engagement with said second ball, said pin being slidingly mounted in said nut bore wherein said pin is held in engagement with said second ball when the external atmosphere is below said predetermined temperature.

9. The valve as set forth in claim 8 further comprising sealing means mounted in said nut in sealing engagement with said pin wherein fluid is prevented from flowing into said nut bore.

* * * * *